(12) United States Patent
Baik

(10) Patent No.: US 8,806,075 B2
(45) Date of Patent: Aug. 12, 2014

(54) METHOD OF RESTORING CONFIGURATION OF PROFIBUS AND PROFIBUS NETWORK SYSTEM

(71) Applicant: LSIS Co., Ltd., Anyang-si (KR)

(72) Inventor: Joo Hyun Baik, Anyang (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 0 days.

(21) Appl. No.: 13/723,755

(22) Filed: Dec. 21, 2012

(65) Prior Publication Data
US 2013/0166784 A1 Jun. 27, 2013

(30) Foreign Application Priority Data
Dec. 22, 2011 (KR) .................. 10-2011-0140358

(51) Int. Cl.
*G05F 3/00* (2006.01)
*G06F 15/177* (2006.01)
*G06F 13/42* (2006.01)

(52) U.S. Cl.
CPC .............. *G06F 15/177* (2013.01); *G06F 13/42* (2013.01)
USPC ............................................................ 710/8

(58) Field of Classification Search
None
See application file for complete search history.

(56) References Cited

U.S. PATENT DOCUMENTS

| 6,449,715 B1* | 9/2002 | Krivoshein ..................... 713/1 |
| 7,178,103 B2* | 2/2007 | Humphrey et al. ........... 715/234 |
| 7,222,131 B1* | 5/2007 | Grewal et al. ................. 717/168 |

FOREIGN PATENT DOCUMENTS

| JP | 2009-181431 | 8/2009 |
| JP | 2011-071619 | 4/2011 |
| KR | 10-2009-0099438 | 9/2009 |

OTHER PUBLICATIONS

Korean Intellectual Property Office Application Serial No. 10-2011-0140358, Office Action dated Jan. 18, 2013, 3 pages.

* cited by examiner

*Primary Examiner* — Idriss N Alrobaye
*Assistant Examiner* — Dayton Lewis-Taylor
(74) *Attorney, Agent, or Firm* — Lee, Hong, Degerman, Kang & Waimey

(57) ABSTRACT

A method of restoring a profibus configuration according to an embodiment includes receiving a configuration restoration command by the configuration restoration device of a profibus network system; receiving a binary image from the master device of the profibus network system by the configuration restoration device; creating restoration information including at least one of the configuration information of the profibus network system, the basic information of the slave device associated with the master device, and user configuration information from the binary image by the configuration restoration device; and outputting the created restoration information. The configuration of a profibus network may be restored from the master device by using this.

13 Claims, 3 Drawing Sheets

METHOD OF RESTORING CONFIGURATION OF PROFIBUS AND PROFIBUS NETWORK SYSTEM

CROSS-REFERENCE TO RELATED APPLICATIONS

Pursuant to 35 U.S.C. §119(a), this application claims the benefit of earlier filing date and right of priority to Korean Patent Application No. 10-2011-0140358, filed on Dec. 22, 2011, the contents of which are hereby incorporated by reference herein in their entirety.

TECHNICAL FIELD

The present disclosure relates to a method of restoring the configuration of a profibus and a profibus network system and more particularly, to a method of restoring the configuration of a profibus from data input to a master device and a profibus network system using the same.

More particularly, the present disclosure relates to a method of restoring the configuration of a profibus from the driving data on a master to enable a user to reconfigure the same, and to a restorable profibus network system.

BACKGROUND ART

A profibus is the abbreviation for a process field bus and is a field bus that Bosch, Klockener-Moeller, and Siemens have jointly developed. It is an industrial communication protocol that has been internationally designated as a standard by Germany standard DIN 19 245, European standard EN 50 170, and International standard IEC 61158.

The profibus is used for the real time communication between pieces of field equipment in the fields of production automation, process control, building automation, etc., includes profibus-FMS (Fieldbus Message Specification) for general-purpose automation, profibus-DP (Decentralized Periphery) for factory automation, and profibus-PA (Process Automation) for process control automation according to the application field, and generally, profibus-DP that is used mainly for factory automation is most widely used.

The profibus-DP is an open industrial network, uses layers corresponding to a physical layer, a data link layer, and a user layer, and has been designed so that a user can confirm many functions through the user layer for the optimization of performance. The physical layer mainly uses RS-485 but also supports optical fiber, and uses a specific transmitting line resisting noise to protect industrial sites.

FIG. 1 is a structural chart of a general profibus network.

Referring to FIG. 1, the profibus network may include a control unit 10, a GSD input unit 11, a user input unit 12, a storage unit 13, a display unit 14, a communication processing unit 15, a master device 16, and one or more slave devices 17.

The GSD input unit 11 receives GSD files acting as the basic information files of the slave devices 17 for enabling the master device 16 to control the slave devices, and transmits them to the control unit.

The control unit 10 receives profibus configuration information made by users from the user input unit 12, modifies the basic information in the GSD filed received from the GSD input unit 11 and the configuration information made by users on the basis of the slave devices 17 that are actual instruments installed at a site, and inspects the effectiveness of the values and associations between them to create images that may be driven at a master.

The communication processing unit 15 network-processes the images created at the control unit 10, converts the result to UART or USB serial data, and transmits the result to the master device 16.

In addition, the master device 16 manages a profibus network on the basis of the received images and controls the operations and data flows of the slave device 16.

Configuration information on this profibus network and profibus DP network device configuration information must be kept and managed in accordance with an industrial device that is operated and maintained for decades, such as a steel plant and an automobile production line. Since a long time elapses however, the initial configuration information is likely to be lost due to the retirement of engineers or the occurrence of a natural disaster.

In addition, when building an automation facility, there is the problem that it is very cumbersome for network devices that participate in setup to share the changes that are made in network configuration information files and make the versions match.

In addition, there is a problem that although rapid restoration is needed when a problem occurs while operating a master device, time is required for restoration because production lines and data storages are at different locations.

DISCLOSURE OF THE INVENTION

Technical Problem

Embodiments provide a method of restoring profibus configurations and a profibus network system that restore profibus configuration information on the basis of the driving data of a master device installed at a site and enable its reconfiguration to solve the problems described above.

Embodiments also provide a method of restoring profibus configuration and a profibus network system that may assist in operating an industrial facility for a long term by enabling to reconfigure a profibus network from the master device installed at a site.

Embodiments also provide a method of restoring profibus configuration and a profibus network system that restore profibus configuration from a master device to be able to take urgent actions if a problem occurs at a site or urgent maintenance is needed.

Technical Solution

In one embodiment, a method of restoring a profibus configuration includes receiving a configuration restoration command by the configuration restoration device of a profibus network system; receiving a binary image from the master device of the profibus network system by the configuration restoration device; creating restoration information including at least one of the configuration information of the profibus network system, the basic information of the slave device associated with the master device, and user configuration information from the binary image by the configuration restoration device; and outputting the created restoration information.

In another embodiment, a profibus network system includes a configuration logic processor creating a binary image that includes at least one of basic information for allowing a master device to control a slave device, the configuration information of the profibus network system, and user configuration information; a communication processor receiving the binary image from the configuration logic processor and processing data to transmit the data to the master device; a master device receiving the binary image from the communication processor and being driven according to the binary image to control the slave device; and a configuration restoration device receiving the binary image from the master device and creating restoration information to restore the configuration of the master device.

Advantageous Effects

Embodiments according to the present disclosure restore profibus configuration information on the basis of the driving data of the master device installed at a site and enable its reconfiguration to provide convenience for profibus network operations.

In addition, embodiments according to the present disclosure enable profibus configuration restoration from a master device to allow the maintenance of an industrial facility to be rapidly carried out if urgent maintenance is needed.

In addition, embodiments according to the present disclosure may provide a base on which an industrial facility may be operated for a long term, since it is possible to restore profibus configuration from a master device.

MODE FOR CARRYING OUT THE INVENTION

Figure 1:
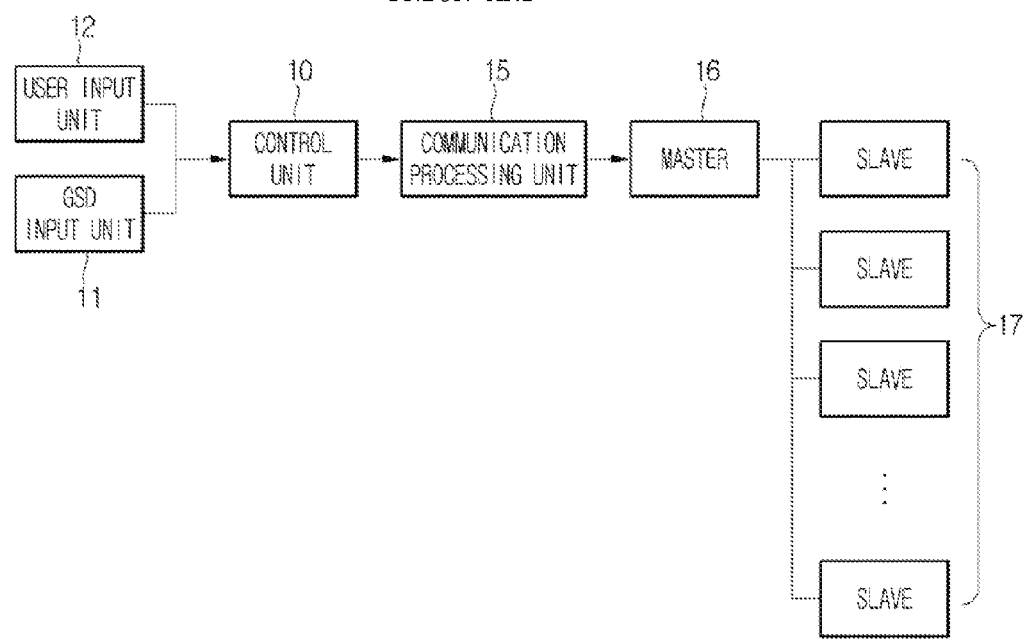
FIG. 1 is a view representing a profibus network system.

The followings just illustrate the principle of the present disclosure. Therefore, those skilled in the art can invent various devices that embody the principle of the present disclosure and fall within the concept and scope of the present disclosure although not clearly described or illustrated in the specification. In addition, all the conditional terms and embodiments enumerated in the specification should be understood in principle as being clearly intended only to make the concept of the present disclosure understood and as being not limited to the embodiments and states particularly enumerated in this way.

In addition, all detailed descriptions enumerating a specific embodiment as well as the principle, perspective, and embodiments of the present disclosure should be understood as being intended to include structural and functional equivalents of these matters. In addition, such equivalents should be understood as including equivalents to be developed in future as well as currently known equivalents, namely, all elements invented to perform the same functions regardless of structures.

Thus, for example, the block diagrams of the specification should be understood as representing the conceptual perspective of an exemplary circuit embodying the principle of the present disclosure. Similarly, all flow charts, state transition diagrams, pseudo codes, etc. can practically be represented on a computer readable medium and should be understood as representing various processes that are performed by a computer or a processor whether or not the computer or the processor has clearly been illustrated.

The functions of various elements illustrated in diagrams including processors or functional blocks represented as concepts similar to these can be provided by the use of hardware with abilities to execute software in relation to proper software as well as dedicated hardware. When provided by processors, the functions can be provided by single dedicated processor, single shared processor, or a plurality of individual processors, some of which may be shared.

In addition, the clear use of a processor, control, or a term presented as a concept similar to these should not be construed by exclusively reciting hardware with abilities to execute software but should be understood as implicitly including digital signal processor (DSP) hardware, ROMs, RAMs, and non-volatile memories for storing software without limitation. Other hardware that has been known and is being used may also be included.

In the claims of the present disclosure, the components represented as units for performing the functions described in the detailed description has been intended as including for example combinations of circuit elements performing the functions or all methods performing functions including all types of software including firmware/micro codes and are combined with proper circuits for executing the software to perform the functions. Since the function provided by the means enumerated variously are combined with each other and are combined with the manners requested in claims in the disclosure defined by these claims, it should be understood that any means capable of proving the functions is equivalent to that recognized from the specification.

The objects, features, and advantage described above will become clearer through the following detailed description related to the accompanying drawings, therefore those skilled in the art to which the present disclosure pertains can easily embody the technical spirit of the present disclosure. In addition, the detailed description on known technologies related to the present disclosure will not be provided while describing the present disclosure, if it is determined that such a detailed description may unnecessarily obscure the subject matter of the present disclosure.

An exemplary embodiment according to the present disclosure will be described in detail below with reference to the accompanying drawings.

The postfix "module" and "unit" for the components used in the following descriptions are simply given considering the ease of the writing of the specification and the "module" and "unit" may be interchanged in use.

Further, although embodiments are described with reference to the accompanying drawings and the contents depicted in the accompanying drawings, the present disclosure is not limited or defined by the embodiments.

The terms used in the specification has been selected as general terms currently widely used if possible considering the functions in the present disclosure, but they may depend on the intentions of those skilled in the art, practice, the appearance of new technologies, etc. In addition, specific cases use the terms selected arbitrarily by the applicant and in these cases, their meaning will be described when describing corresponding inventions. Thus, it should be noted that the terms used in the specification should be construed on the basis of their actual meanings and contents through the specification, not just their names.

Figure 2:
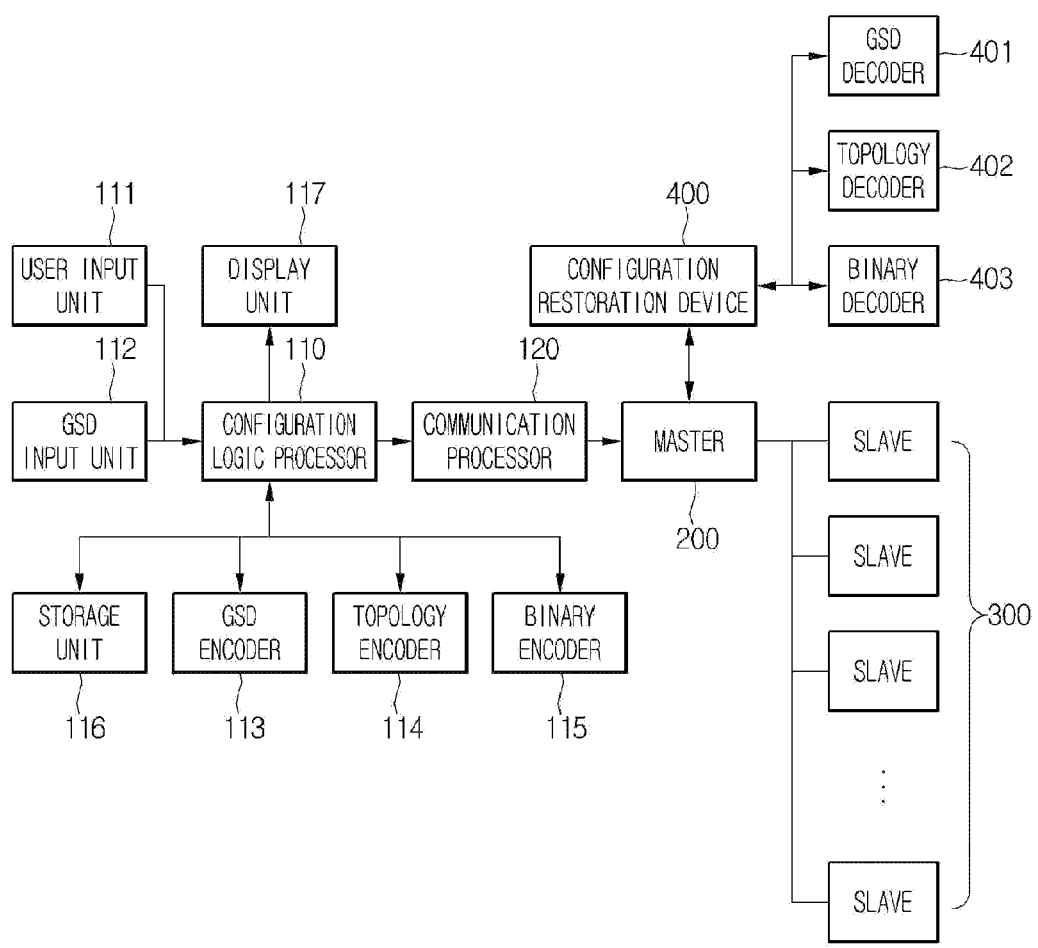
FIG. 2 is a block diagram representing a profibus network system according to an embodiment.

FIG. 2 is a block diagram representing a profibus network system according to an embodiment.

As illustrated in FIG. 2, a profibus network system according to an embodiment includes a configuration logic processor 110, a user input unit 111, a GSD input unit 112, a GSD encoder 113, a topology encoder 114, a binary encoder 115, a storage unit 116, a display unit 117, a communication processor 120, a master device 200, one or more slave devices 300, a configuration restoration device 400, a GSD decoder 401, a topology decoder 402, and a binary decoder 403.

The GSD input unit 112 receives GSD files including the basic information of the slave devices 300. At this point, the GSD files are the abbreviation of general station description files and may be ones on which profibus device manufacturers describe the manufacturing sources of their devices in conformity to a protocol made by a profibus user association and distribute them to users.

In addition, the GSD files are device driver files supporting a plug and play function and the suppliers of the slave devices 300 should together supply GSD files that include the basic information of corresponding devices. The GSD files in an ASCII format made according to a certain form are stored in the master device 200 to control a corresponding slave device 300 via binary processing for transmission and enable the master device 200 to control the slave device 300.

In addition, the basic information stored in the GSD files may include the transmission rate of a corresponding slave device, the length of a transmitted message, the length of input/output data, the meanings of diagnostic messages, and selection specifications for a modular device and may perform the electronic manual function of the corresponding slave device.

Meanwhile, the GSD files may be input to the GSD input unit 112 and read from the configuration logic processor 110 as described below, and the configuration logic processor 101 may change their values according to user configuration values input through the user input unit 111.

The user input unit 111 receives the user's configuration values to drive the slave device 300 and transmits it to the configuration logic processor 110.

In addition, the configuration logic processor 110 creates binary images being able to be driven by the master device 200 on the basis of the user's configuration values received from the user input unit 111 and the GSD file of a corresponding instrument received from the GSD input unit 112. The binary images are ones used when the master device 200 drives the slave device, and the configuration logic processor 110 may create them by combining the user's configuration values with the GSD files according to the communication property of profibus and the property of the master device 200.

Such a configuration logic processor 110 controls the operations of the storage unit 116 for storing information necessary for processing, the GSD encoder 113 extracting and encoding GSD information from the GSD files, the topology encoder 114 encoding topology information representing profibus network configuration information, and the binary encoder for creating the binary images, transceives data to create the binary images, and transmits the created binary images to the communication processor 120.

The communication processor 120 transmits the received binary images to the master device 200 via data converting processing according to the communication protocol associated with the master device 200. The communication protocol may include a communication protocol for a profibus network that may be less affected by noise in an industrial facility environment.

The master device 200 is driven according to the received binary images. The master device 200 may transmit commands to the slave device 300 according to the binary images and receive the states of the slave devices 300 to control the slave devices 300 depending on preset conditions and situations.

Meanwhile, if there is a need to restore a configuration, the master device 200 may transmit the binary image to the configuration restoration device 400. The configuration restoration device 400 may be placed at industrial settings or automation sites along with the master device 200 to enable rapid restoration.

In addition, the configuration restoration device 400 receives the binary image being driven in the master device 200 and restores a user's configuration and GSD information from the binary image.

The configuration restoration device 400 may control the binary decoder 403, the topology decoder 402, and the GSD decoder 401 to restore its configuration.

The binary decoder 403 may convert the binary image received from the configuration restoration device 400 to coded data according to the control of the configuration restoration device 400. In addition, the coded data is transmitted back to the configuration restoration device 400.

In addition, the topology decoder 402 decodes and extracts topology information including representation information on profibus network configuration information as described above, from the binary image. The extracted topology information is transmitted back to the configuration restoration device 400.

Meanwhile, the GSD decoder 401 extracts the GSD information from the binary information. The GSD information may be information that has been created by the GSD file input from the configuration logic processor 110 and a user input and has been encoded and included in a binary image. The GSD information includes information that is matched to the coded data of the decoded binary image to restore how the contents of the GSD file and a user configuration has been input. For example, if a specific code represents after decoding the binary image, the code may be recognized as motor driving information on watergate opening/closing on the basis of the GSD information, and the configuration restoration device 400 may thus restore basic information on a way of driving the watergate opening/closing and user input information included in the binary image.

The configuration restoration device 400 may restore the user configuration information and pieces of basic information on the slave device 300 included in the binary image through the GSD decoder 401, the topology decoder 402, and the binary decoder 403 as described above.

That is, the configuration restoration device 400 receives the binary image from the master device 200, restores it as coded data through the binary decoder 403, restores topology information through the topology decoder 402, and restores GSD information on the slave device 300 through the GSD decoder 401.

In addition, the configuration restoration device 400 may match the restored coded data to the restored GSD information to restore the basic information of the slave device 300 and user configuration data as original. In addition, the configuration restoration device 400 may associate the topology information, user configuration data, and pieces of basic information of the slave device 300 that have been restored in this way. Thus, the configuration restoration device 400 may provide restoration information that enables a user to check and re-configure the driving configurations of the master device 200 and slave device 300.

In addition, the configuration restoration device 400 may re-configure the restored restoration information on the basis of a user input and enable the master device 200 to be driven in the state reconfigured by using the reconfigured data.

In particular, in embodiments, when the master device 200 is abnormally driven, a facility has been worn out, or an existing configuration file has been lost due to natural disaster, then the existing configuration of a profibus network may be restored through the configuration restoration device 400 as described above. Thus, embodiments may have an effect of reducing losses if problems occur.

Figure 3:
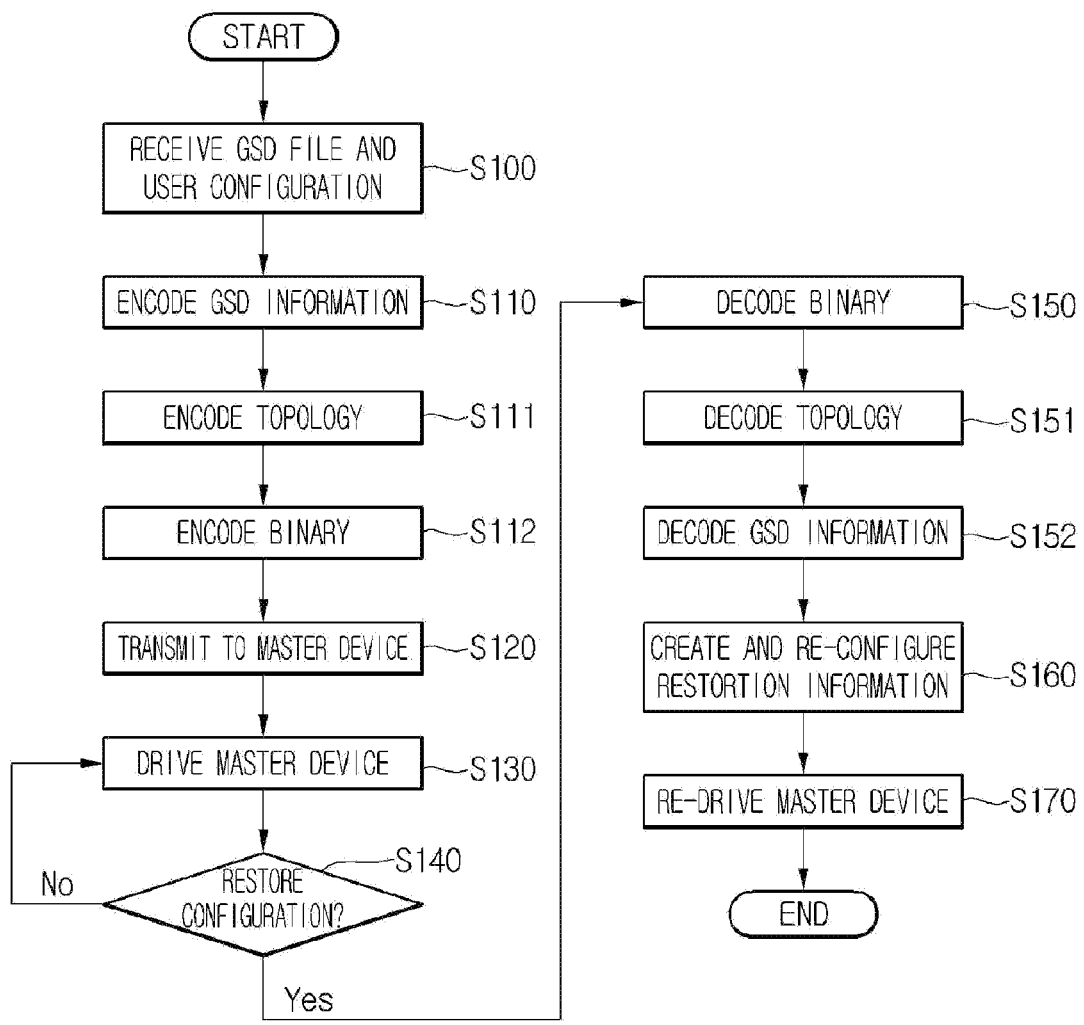
FIG. 3 is a flow chart representing a method of restoring profibus configuration according to an embodiment.

FIG. 3 is a flow chart sequentially illustrating a method of restoring a profibus configuration according to an embodiment.

A method of restoring a profibus configuration according to an embodiment with reference to FIG. 3 is described below.

First, the configuration logic processor 110 receives a GSD file on a slave device 300 to be controlled and a user configuration value through the GSD input unit 112 and the user input unit 111, in step S110.

Subsequently, the configuration logic processor encodes the GSD information extracted from the received GSD file and user configuration value by using a GSD encoder 113, in step S110.

In addition, the configuration logic processor 110 encodes topology information including profibus network configuration information extracted from the received GSD file and user configuration value by using a topology encoder 114, in step S111.

Subsequently, the configuration logic processor 110 encodes the encoded GSD information and topology information and master driving information as a binary image by using a binary encoder 115, in step S112.

In addition, the communication processor 120 receives the encoded binary image from the configuration logic processor 110, processes data for communication, and transmits the processed data to the master device 200.

Subsequently, the master device 200 is driven on the basis of the received binary image and controls its operation depending on the state of the slave device 300, in step S130.

Meanwhile, if during the driving of the master device 200, it is recognized that there is a need to restore a configuration or a configuration restoration mode operates by a command, then the configuration restoration device 400 operates, in step S140. To that end, the master device 200 transmits the binary image being driven to the configuration restoration device 400.

In addition, the configuration restoration device 400 uses the binary decoder 403 to decode the received binary image and creates coded data, in step S150.

Subsequently, the configuration restoration device 400 uses the topology decoder 403 to decode the received binary image and creates topology information, in step S151.

In addition, the configuration restoration device 400 uses the GSD decoder 403 to decode the received binary image and creates GSD information, in step S153.

Subsequently, the configuration restoration device 400 restores information input in the master device 200 according to the first user input and GSD file on the basis of the created coded data and topology information and GSD information. In addition, the configuration restoration device 400 processes it to a type configurable by a user through restoration information to enable a re-configuration according to a user input, in step S160.

Last, at least one of information restored or information re-configured in the configuration restoration device 400 is re-input to the master device 200, and the master device 200 is re-driven on the basis of the re-input restoration information and controls the slave devices 300, in step S170.

Meanwhile, according to an embodiment, the storage unit 116 may store programs for processing and controlling each signal in the configuration logic processor 110 and configuration restoration device 400. In addition, the configuration logic processor 110 or configuration restoration device 400 may further include a processor for executing such programs.

The storage unit 116 may include at least one of types of storage mediums, for example, a flash memory type, a hard disk type, a multimedia card micro type, a card memory type (for example, SD or XD memory, etc.) a RAM, a ROM (including EEPROM). In addition, although FIG. 3 illustrates an embodiment in which the storage unit 116 is provided separately from the configuration logic processor 110 or configuration restoration device 400, the scope of the present disclosure is not limited thereto. The storage unit 116 may also be included in the configuration logic processor 110 or configuration restoration device 400.

The method of restoring the profibus configuration according to the embodiment described above may be manufactured as a program to be executed in a computer and stored in computer readable recording mediums, examples of include ROMs, RAMs, CD-ROMs, magnetic tapes, floppy disks, optical data storages and further includes a thing embodied in the form of carrier wave (for example, transmission for the internet).

The computer readable recording medium may be distributed to computer systems connected by a network, store and execute computer readable codes in a distributed way. In addition, functional programs, codes, and code segments for embodying the methods may be easily inferred by programmers in the technical field to which the present disclosure pertains.

In addition, although exemplary embodiments have been illustrated and described above, the present disclosure is not limited specific embodiments described above but may be varied by those skilled in the art without departing from the subject matter of the present disclosure claimed in the following claims. Further, these variations should not be understood individually from the technical spirit or perspective of the present disclosure.

What is claimed is:

1. A method of restoring a profibus configuration, comprising:
receiving a configuration restoration command by a configuration restoration device of a profibus network system;
receiving a binary image from a master device of the profibus network system by the configuration restoration device;
creating restoration information including at least one of configuration information of the profibus network system, basic information of a slave device associated with the master device, or user configuration information from the binary image by the configuration restoration device; and
outputting the created restoration information,
wherein the binary image comprises data encoded on at least one of the basic information of the slave device, the user configuration information, or the configuration information of the profibus network system, wherein the configuration restoration device decodes the encoded data.

2. The method according to claim 1, wherein the creating of the restoration information comprises:
creating coded data by decoding the binary image; and
creating the restoration information by matching at least one of the configuration information of the profibus network system, the basic information of the slave device, and the user configuration information to the coded data.

3. The method according to claim 1, wherein the binary image comprises control information used when the master device controls the slave device.

4. The method according to claim 1, further comprising re-driving the master device on the basis of the restoration information.

5. The method according to claim 1, further comprising:
receiving user reconfiguration information on the restoration information; and
re-driving the master device on the basis of the received reconfiguration information.

6. The method according to claim 1, wherein the basic information of the slave device comprises GSD information on the slave device.

7. The method according to claim 6, further comprising encoding the binary image on the basis of the GSD information, the configuration information of the profibus network system, and the user configuration information and transmitting the encoded binary image to the master device.

8. A profibus network system comprising:
a configuration logic processor creating a binary image that includes at least one of basic information for allowing a master device to control a slave device, configuration information of the profibus network system, or user configuration information;
a communication processor receiving the binary image from the configuration logic processor and processing data to transmit the data to the master device;
a master device receiving the binary image from the communication processor and being driven according to the binary image to control the slave device; and
a configuration restoration device receiving the binary image from the master device and creating restoration information to restore the configuration of the master device,
wherein the binary image comprises data encoded on at least one of the basic information of the slave device, the user configuration information, or the configuration information of the profibus network system and,
wherein the configuration logic processor comprises a GSD input unit receiving GSD information including the basic information, and a user input unit receiving the user configuration information, and encodes at least one of the GSD information, the user configuration information, or the configuration information of the profibus network system into the binary image, and
wherein the configuration restoration device decodes the binary image.

9. The system according to claim 8, wherein the configuration restoration device creates the restoration information according to at least one of the configuration information of the profibus network system, the GSD information, or the user configuration information.

10. The system according to claim 8, wherein the binary image comprises control information used when the master device controls the slave device.

11. The system according to claim 8, wherein the master device is re-driven on the basis of the restoration information.

12. The system according to claim 8, wherein the configuration restoration device receives user reconfiguration information on the restoration information, and the master device is re-driven on the basis of the received reconfiguration information.

13. A computer readable recording medium on which a program to perform the method according to claim 1 has been recorded.

* * * * *